(12) United States Patent
Leblanc (10) Patent No.: US 6,854,910 B2
(45) Date of Patent: Feb. 15, 2005

(54) PORTABLE WINDOW/WINDSHIELD CLEANING DEVICE

(76) Inventor: Gilles Leblanc, 116 rue des Peupliers, Ste-Anne-des-Plaines, QC (CA), J0N 1H0

( * ) Notice: Subject to any disclaimer, the term of this patent is extended or adjusted under 35 U.S.C. 154(b) by 0 days.

(21) Appl. No.: 10/210,982

(22) Filed: Aug. 5, 2002

(65) Prior Publication Data

US 2003/0037390 A1 Feb. 27, 2003

Related U.S. Application Data

(60) Provisional application No. 60/314,152, filed on Aug. 23, 2001.

(51) Int. Cl.$^7$ ............................................. A46B 11/00
(52) U.S. Cl. .................. 401/118; 401/123; 15/121; 15/236.02; 15/245; 221/96; 221/97; 206/389; 220/735; 220/740; D32/41; D32/45
(58) Field of Search ................................ 401/18, 118, 121, 401/123, 191, 195; 15/117, 121, 185, 236.02, 245; 221/96, 97, 197, 287; 206/15.3, 216, 349, 389, 514; 220/529, 570, 735, 736, 740, 759, 760; D32/41, 42, 45, 53, 54

(56) References Cited

U.S. PATENT DOCUMENTS

| | | | | |
|---|---|---|---|---|
| 3,851,756 A | * | 12/1974 | Brown | ........................ 206/216 |
| 4,122,944 A | * | 10/1978 | De Napoli | ................... 206/349 |
| 4,143,792 A | * | 3/1979 | Rex | ............................. 221/97 |
| 4,759,470 A | * | 7/1988 | Jacobs | ......................... 221/97 |
| 5,624,093 A | * | 4/1997 | Gemmell | ..................... 220/759 |
| 6,036,388 A | | 3/2000 | Atcher | |

\* cited by examiner

*Primary Examiner*—Tuan Nguyen (57) ABSTRACT

A portable window/windshield cleaning device is self contained with washing liquid and a squeegee.

2 Claims, 7 Drawing Sheets

PORTABLE WINDOW/WINDSHIELD CLEANING DEVICE

Applicant claims priority based on provisional application 60/314,152 filed Aug. 23, 2001.

FIELD OF THE INVENTION

The present invention relates to improvements in cleaning devices, specifically sponge and rubber squeegee apparatus for a wide variety of windows/windshields and more particularly to a portable window/windshield cleaning device which can be conveniently utilized in any situation which favors portability.

BACKGROUND OF THE INVENTION

Devices for window/windshield cleaning or washing have been known in art for a long time. Practically all gas stations and different washing services as well as domestic and commercial places use many different window/windshield cleaning devices which basically have a common structural configuration.

Many devices are available either for domestic or commercial use. U.S. Pat. No. 6,036,388 by Atcher discloses a windshield washing service unit primarily developed for the purpose of holding cleaning equipment and supplies for windshields and the like therein, at gas station locations.

The limitation of the prior art is that devices may be utilized in a fixed or stationary situation when mounted to vertical surfaces.

SUMMARY OF THE INVENTION

It is therefore the object of the present invention to provide a portable window/windshield cleaning device that obviates the above-mentioned disadvantages.

Another object of the present invention is that the portable window/windshield cleaning device can be carried inside a vehicle in motion.

A further object of the present invention is that the portable window/windshield cleaning device is a self-contained, unit that can be used at any location.

Still another object of the present invention is that the portable window/windshield cleaning device is simple and adaptable, having components, which assemble and/or disassemble to improve portability while in transport as well as in use.

Still a further object of the present invention is that the portable window/windshield cleaning device whose external housing is designed in a fashion which makes the device interlockably stackable in pyramidal configurations for ease in warehousing, shipping to distributors as welll as Point of Purchase display applications for retailers.

Yet a further object of the present invention is that the portable window/windshield cleaning device is conveniently at hand in the event of sudden extreme weather conditions that require emergency measures to ensure a clean windshield.

Other objects and advantages of the present invention will become apparent from a careful reading of the detailed description provided herein, with appropriate reference to the accompanying drawings.

BRIEF DESCRIPTION OF THE DRAWINGS

An embodiment of the present invention will now be disclosed, by way of example, in reference to the following drawings in which:

FIG. 7 Is a perspective view of a fourth embodiment of a portable window/windshield cleaning device according to the present invention, showing the device when in use with the lid open and the squeegee being extracted therefrom.

DETAILED DESCRIPTION OF THE PREFERRED EMBODIMENTS

With reference to the annexed drawings the preferred embodiments of the present invention will be herein described for indicative purposes and by no means as of limitation.

Figure 1:
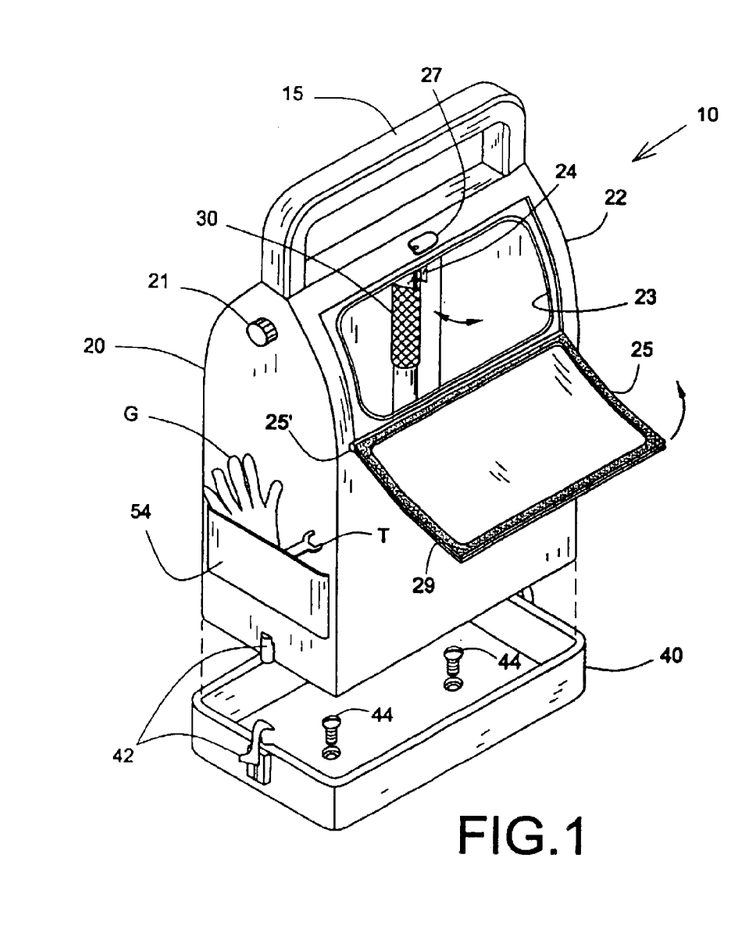
FIG. 1 Is an exploded perspective view of an embodiment of a portable window/windshield cleaning device according to the present invention when in use.

FIG. 1 illustrates an embodiment of a portable device for windshield cleaning (10) which includes a housing (20)

having a receptacle (22) and a lid (25) pivotally connected to the housing (20). The housing (20) has a handle (15) usually integral with an upper part of the housing (20). In the transport configuration (FIG. 3) the lid (25) is kept closed by a locking member (27) to hermetically seal the receptacle (22). Accordingly, as seen in FIG. 1, in use, either the lid (25) or the housing (20) has a sealing member (29) surrounding its perimeter or the opening (23) of the receptacle (22). When the locking member (27) is unlocked, the lid (25) is opened for the user to either pour some cleaning liquid (L) therein, insert a squeegee (30) therefrom, or clean the receptacle (22).

The housing (20) has a plugged discharging hole (21) for discharging used and dirty cleaning liquid (L) out from the receptacle (22). The discharging hole (21) is preferably located at the upper part (see FIG. 1) or alternatively at a lower part (see FIG. 3) of the housing (20). The lid has a handgrip (26) or the like for a user to open or close the same by pivoting it about a hinge (25'). The housing (20) is made out of any material that can provide a watertight receptacle and that is preferably transparent or translucent.

Figure 2:
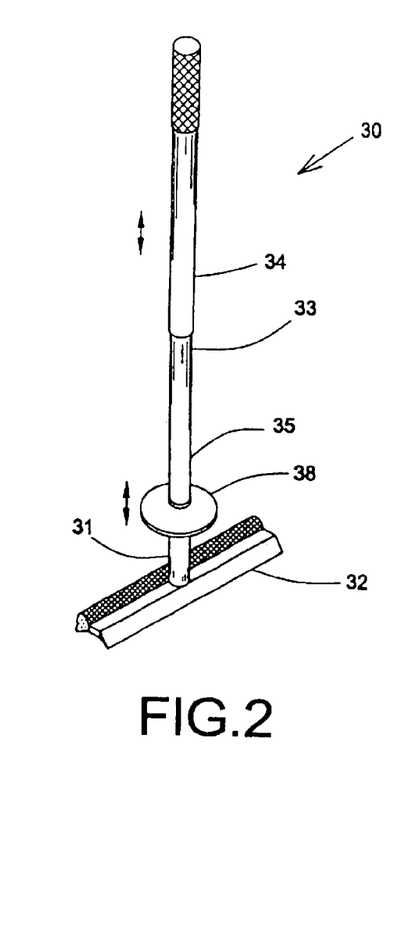
FIG. 2 Is a perspective view of the squeegee of the embodiment of FIG. 1.

Referring to FIG. 2, the squeegee (30) has a shaft (35) which is preferably telescopic and has a conventional cleaning head (32) secured to one end (31) thereof for windshield cleaning. The other end (33) of the shaft (35) is provided with a coated handgrip (34) or the like. To protect the user holding the squeegee (30) from being sprinkled with drippings while cleaning the windshield, a disc-shaped protector (38) is radially secured to the shaft (35) by friction. The axial position of the disc-shaped protector (38) along the shaft (35) can be adjusted by simply sliding it anywhere between the handgrip (34) and the cleaning head (32), preferably in proximity to the handgrip (34) when stored in the housing (20). The disc-shaped protector (38) can easily be removed from the handgrip side of the shaft (35).

Figure 3:
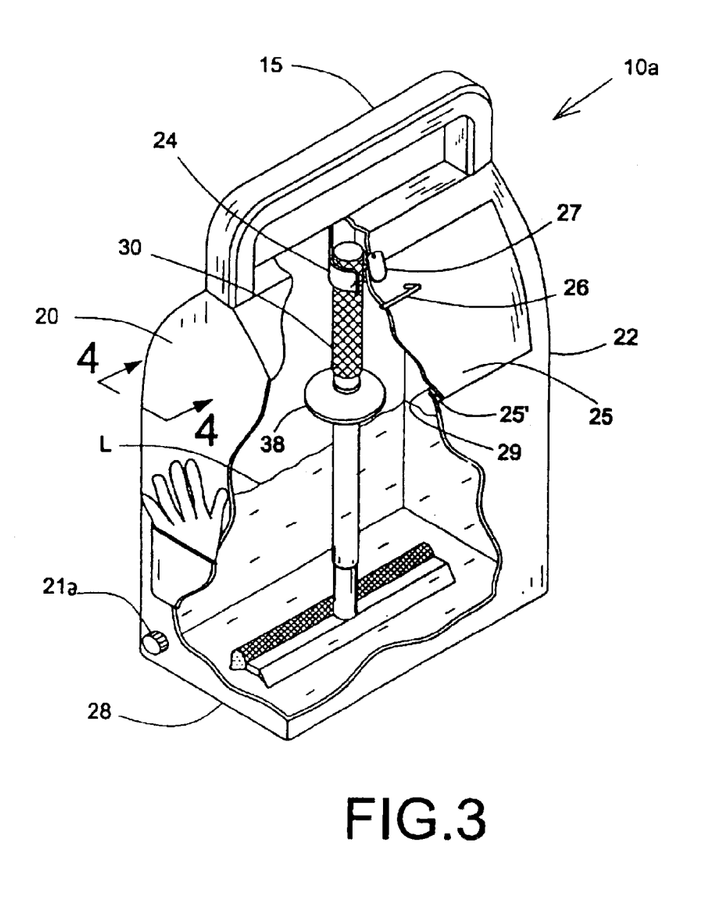
FIG. 3 Is a partially broken perspective view of a second embodiment of a portable window/windshield cleaning device according to the present invention in a transport configuration.

As shown in FIG. 3, a resilient circular clip (24) allows for the shaft (35) to be easily releasably secured into the housing (20) to keep the squeegee (30) in a stable position therein which is also easily reachable by the user. The secured position of the squeegee (30) inside the housing (20) also ensures that the handgrip (34) remains dry and away from the cleaning liquid (L), and the cleaning head (32) remains in immersion into the cleaning liquid (L) when in storage. It can also reduce the possible splashing around of the cleaning liquid (L) inside the housing (20) that occurs during movements of the vehicle. Preferably, the housing (20) has a generally flat bottom wall (28) to keep the device stable on any resting surface.

Figure 4:
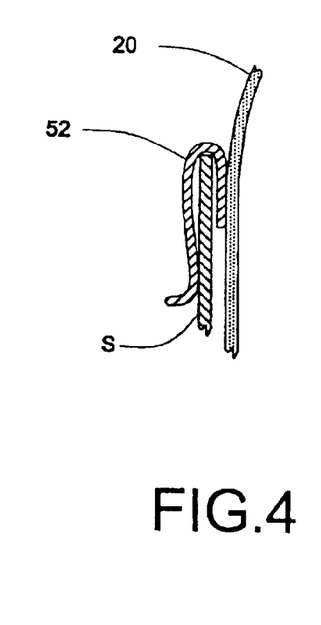
FIG. 4 Is a close-up perspective view taken along line 4—4 of FIG. 3.

As is illustrated in FIG. 1, the device (10) is combined with a base (40) that is preferably and permanently secured inside the cabin of a vehicle (not shown) using any of a variety of securing means. For illustrative purpose, mounting screws (44) are shown here and adapted for releasably receiving the bottom wall (28) of the housing (20) therein and holding the same (20) in a stable upright position, especially during travelling. For the same purpose the base (40) has at least one securing element (42) to lock the housing (20) thereto. To be more versatile, the housing (20) could include at least one external holder (52) mounted on the side of the housing (20), as illustrated in FIG. 4, to releasably secure the same onto different vertical surfaces (S), such as the door of the vehicle or inside the trunk. Optionally, there could be at least one side pouch (54) connected to a wall of the housing (20) for receiving gloves (G), tools (T), and like accessories therein.

To use this portable device for windshield cleaning (10, 10a), the user opens the lid (25) (see FIG. 1), fills in the housing (20) with cleaning liquid (L) to dip the head (32) of the squeegee (30) therein, inserts the squeegee (30) via the opening (23) into the receptacle (22) of the housing (20), secures the shaft (35) using the circular clip (24), closes and hermetically locks the lid (25) with the locking member (27). The housing (20) is ready for installation either into the base (40) or the holder (52), preferably at any user accessible location for further use whenever required.

Referring to FIGS. 5 to 18, embodiments of a portable device of the present invention for window/windshield cleaning (10b, 10c, 10d, 10e) in which the housing (20b, 20c, 20d, 20e) has a handle releasably secured thereto when in transport configuration that also serves as the shaft (35b, 35c, 35d, 35e) of the squeegee (30b, 30c, 30d, 30e) when in use.

Referring more specifically to the second and third embodiments (10b, 10c) of FIGS. 5 through 8, in transport mode (FIG. 8), the lid (25b, 25c) is kept closed by the handle (35b, 35c) acting as the locking member (27) by axially slidably engaging the corresponding first and second supporting holes 27', 27" of the receptacle (22b, 22c) and of the lid (25b, 25c) to preferably hermetically seal them together. The second supporting holes 27" are preferably screwably engaged by the threaded end (31b, 31c) of the shaft (35b, 35c) releasably secured thereto. The first supporting holes 27' are preferably slightly larger in diameter than the second supporting holes 27" in order to be fitted by a tapered section of the shaft (35b, 35c) at the beginning of the handgrip (34).

Figures 5, 6:
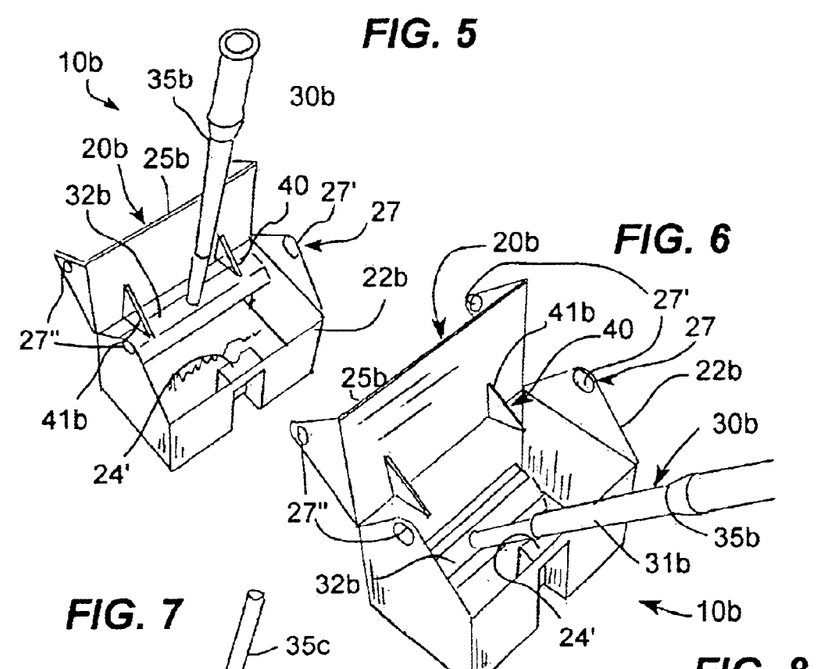
FIG. 5 Is a perspective view of a third embodiment of a portable window/windshield cleaning device according to the present invention, showing the housing when in use with the lid open and the squeegee dipped into the cleaning liquid.
FIG. 6 Is a view similar to FIG. 5, showing the receptacle being carried by the squeegee engaging an in-use transporting clip protruding internally from the lid.

Also shown in FIGS. 5 and 6, the lid (25b) includes fixed hooks (41b) protruding internally therefrom to form an in-use transporting clip (40) which serves the purpose of permitting the cleaning head (32b) of the squeegee unit (30b) to releasably engage the hooks (41b) to facilitate portability when in use (see FIG. 5).

In FIG. 6, the shaft portion of the squeegee head (32b) is shown in its storage position freely resting against a complementary recess 24' as opposed to a resilient clip (24). Similarly, lid (25c) of the device (20c) includes fixed hooks (41c), as shown in FIG. 7. Preferably, the hooks (41b, 41c) are shaped so as to assume the contour of the cleaning head (32b, 32c) and ensure a firm engagement therebetween.

Figures 10, 11:
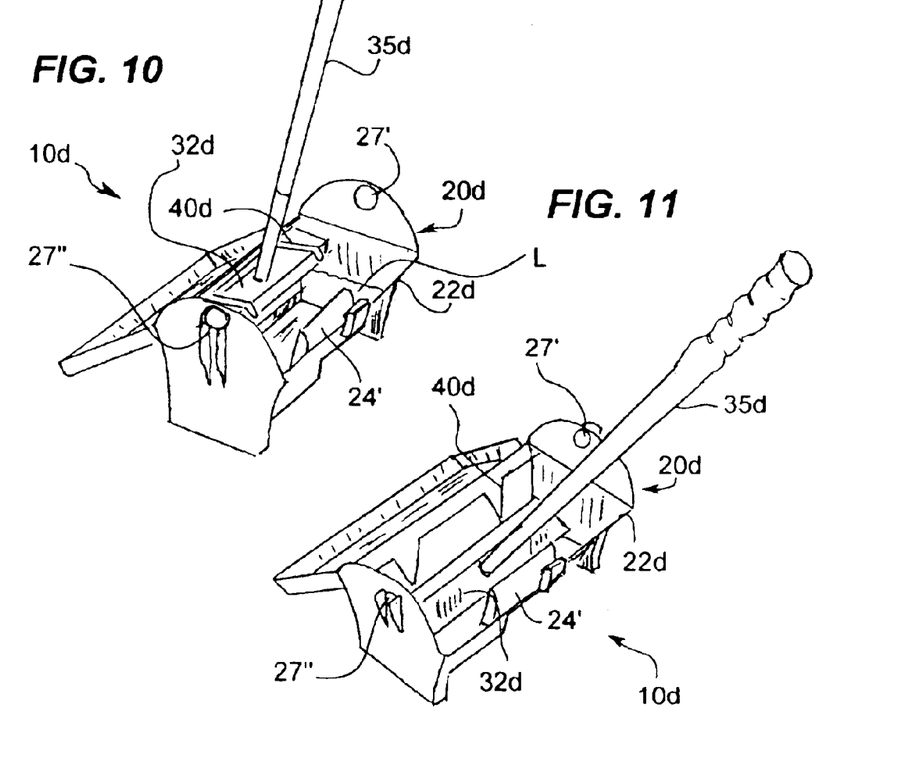
FIG. 10 Is a view similar to FIG. 6, showing the embodiment of FIG. 9 in use configuration with an in-use transporting clip internally pivotally mounted on the receptacle in biased released position.
FIG. 11 Is a view similar to FIG. 8, showing the embodiment of FIG. 9 with the in-use transporting clip is in squeegee engaging position.
Figure 12:
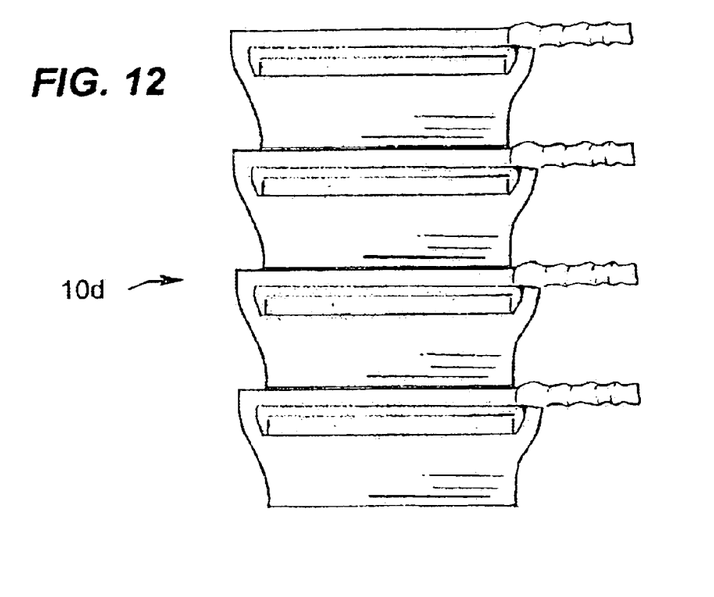
FIG. 12 Is a front elevational view, showing a plurality of devices of the embodiment of FIG. 9 stacked on top of each other.
Figure 13:
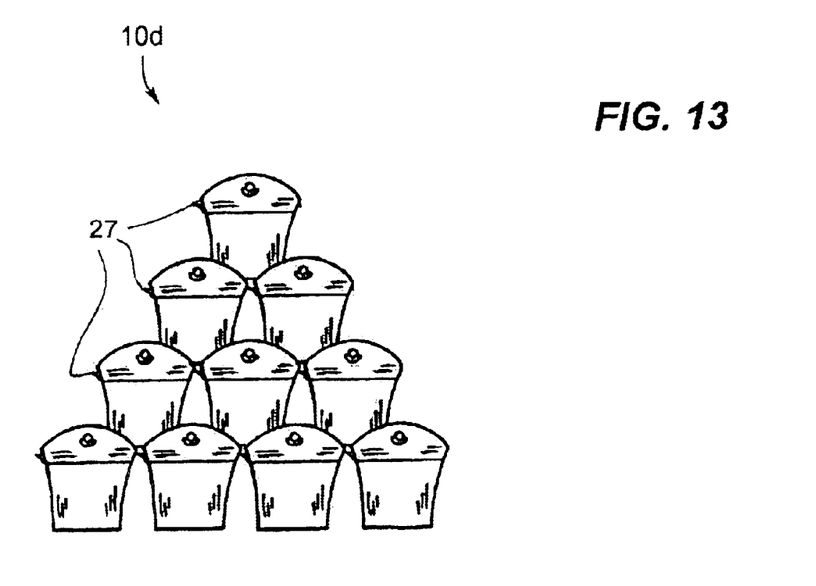
FIG. 13 Is a side elevational view of FIG. 12.

Referring to FIGS. 9 through 13, there is shown a fifth embodiment of a portable window/windshield cleaning device (10d) with a different shaped housing (20d) in transport configuration. This embodiment (10d) includes a spring-loaded, or spring-biased, in-use transporting clip (40d) internally pivotally mounted on the receptacle (22d). The transporting clip (40d) is biased by a spring (not shown) in a released position lowered against an internal side wall of the housing (20d) to permit the cleaning head (32d) easy access to the cleaning liquid (L) when required, as shown in FIG. 10. As shown in FIG. 11, the transporting clip (40d) is in squeegee engaging position with the squeegee (30d) used to carry the device (10d). Furthermore, the design of the housing (20d) is such that it allows for stacking of several units (10d) of the cleaning device in a staggered manner for convenience and economy in storage and shipping as well as efficiency and attractiveness at point-of-purchase locations in retail outlets, as illustrated in FIGS. 12 and 13.

Figure 8:
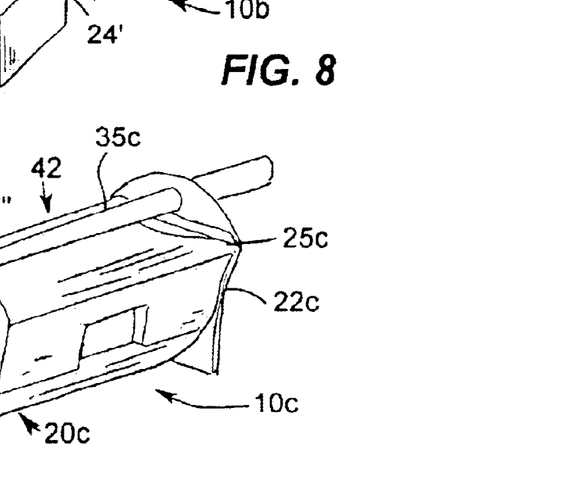
FIG. 8 Is a perspective view of the embodiment of FIG. 7, showing the device in transport configuration with the shaft of the squeegee being the handgrip thereof.
Figure 9:
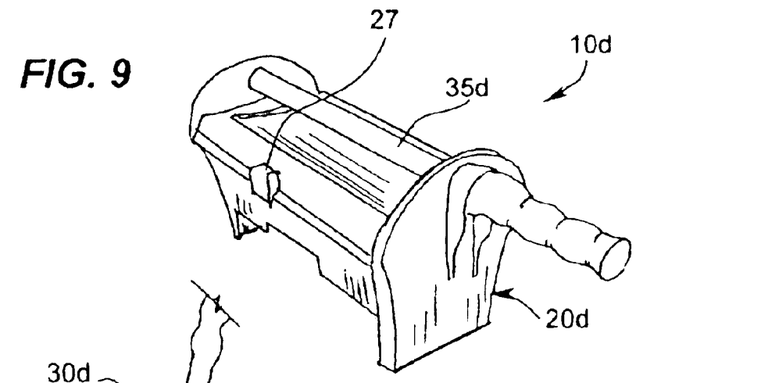
FIG. 9 Is a view similar to FIG. 5, showing a fifth embodiment of a portable window/windshield cleaning device according to the present invention with a different housing in transport configuration.

Referring more specifically to FIGS. 14 through 18, there is shown a sixth embodiment of a portable window/windshield cleaning device (10e) similar to the embodiment (10c) of FIGS. 7 and 8 with a different lock-pin mechanism (50) for securing the first end (31e) of the shaft (35e) to the housing (20e) which allows for safe and convenient portability of the window/windshield cleaning device (10e).

Figure 14:
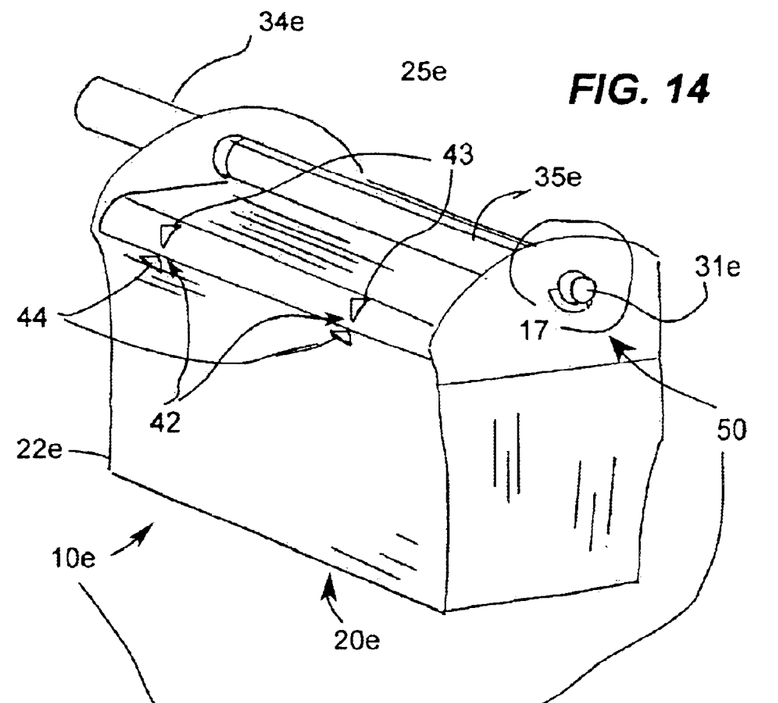
FIG. 14 Is a perspective view of a sixth embodiment of a portable window/windshield cleaning device according to the present invention, showing the device in transport configuration.
Figure 15:
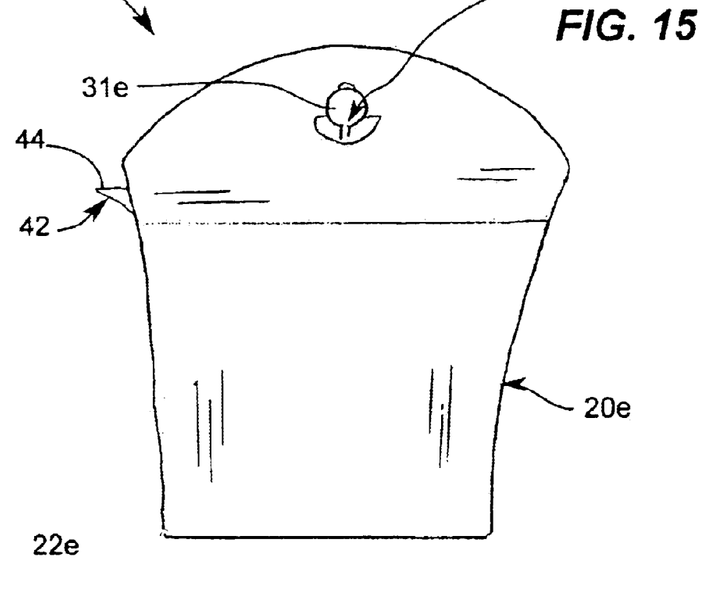
FIG. 15 Is a side elevational view of the embodiment of FIG. 14.

FIGS. 14 and 15 more specifically show the lid-to-receptacle abutment member (42) used to maintain the lid (25e) in opened position in abutment engagement with the receptacle (22e), especially when carrying the device (10e) using the fixed hooks of the in-use transporting clip (40) secured to the lid (25e). The lid-to-receptacle abutment member (42) preferably includes a pair of lid abutting brackets (43) for abuttingly engaging a corresponding pair of receptacle abutting brackets (44) when in lid opened position.

Figure 16:
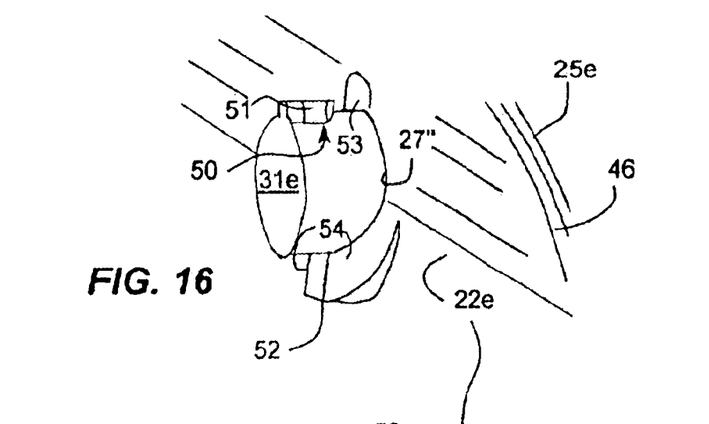
FIG. 16 Is a close-up perspective view taken along line 17 of FIG. 14, showing the lock-pin mechanism in locking position with the housing.
Figure 17:
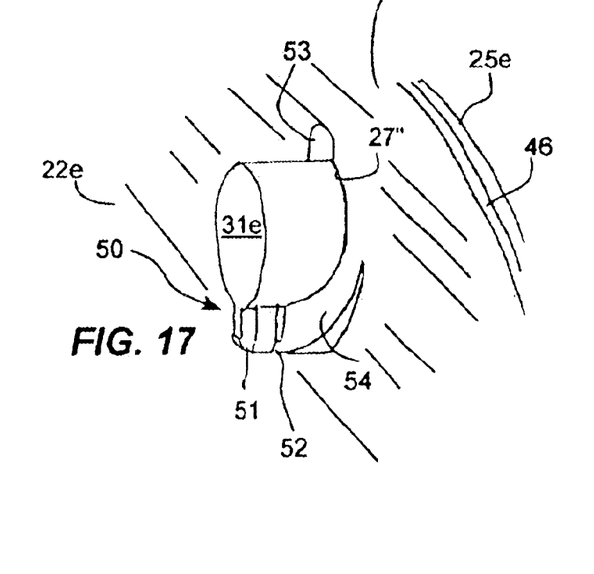
FIG. 17 Is a view similar to FIG. 16, showing the lock-pin mechanism in unlocking position from the housing.

Referring more specifically to FIGS. 16 and 17, the lock-pin mechanism (50) includes a pin (51) protruding substantially radially from the first end (31e) of the shaft (35e) adapted to lockingly engage a pin-locking recess (52) of the receptacle (22e) adjacent the second supporting hole 27" thereof. Accordingly, the shaft (35e) remains secured to the housing (20e) due to the resiliency of its lateral walls (46) protruding upwardly therefrom, the lateral walls (46) being engaged by the locking pin (51) and the tapered section of the shaft (35e) adjacent the handgrip (34e) itself, respectively. The pin (51) is first slidably inserted through the second supporting holes 27" via slots (53) thereof, as shown in FIG. 16. Then the shaft (35) is rotated either side about its axis before the pin (51) slidably engages a circumferentially oriented slope (54) extending substantially axially away from said second supporting hole 27" to force the shaft (35e) to squeeze in between the resilient lateral walls (46), until a partial turn is made wherein the pin (51) releasably engages the pin-locking recess (52) by snapping therein, as shown in FIG. 17.

Figure 18:
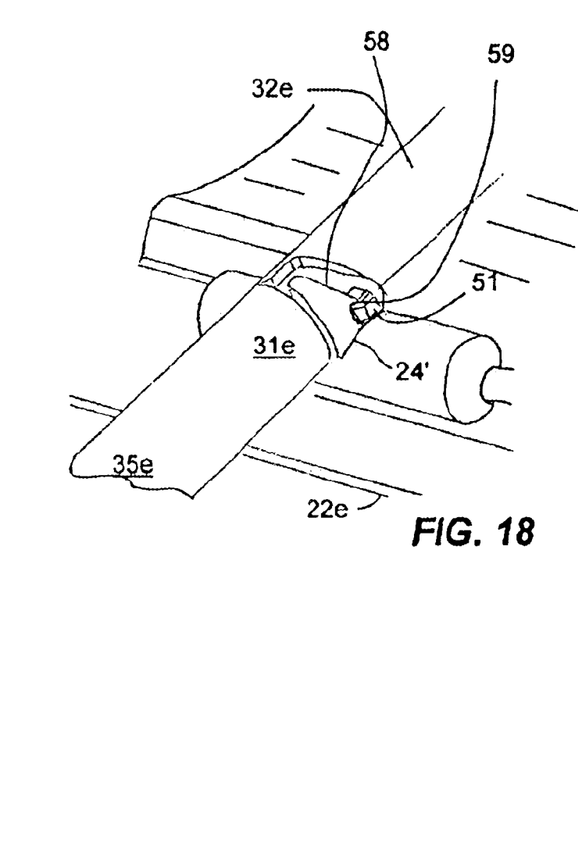
FIG. 18 Is an enlarged perspective view of the embodiment of FIG. 14, showing the lock-pin mechanism in locking position with the squeegee cleaning head.

As shown in FIG. 18, the shaft portion of the squeegee head (32e) includes a preferably partial turn slot (58) adapted to be slidably and releasably engaged by the locking pin (51). The closed end of the slot (58) includes a snapping recess (59) for resiliently and releasably securing the pin (51) therein. Obviously, the housing (20 to 20e) is made of any material that can provide a watertight receptacle.

The cleaning device (10 to 10e) of the present invention is particularly useful for use in goods transportation vehicles that usually travel over long distances in different environmental conditions.

Although the present portable device for window/windshield cleaning has been described with a certain degree of particularity, it is to be understood that the disclosure has been made by way of example only and that the present invention is not limited to the features of the embodiments described and illustrated herein, but includes all variations and modifications within the scope or the present invention.

The embodiments of the invention in which an exclusive privilege or property is claimed are defined as follows:

1. A portable device for windshield cleaning comprising:
   a housing having receptacle and a lid pivotally connected to said housing and said housing having a shaft handle releasably secure to;
   a locking member to hermetically seal said lid in relation to said receptacle;
   a squeegee having a shaft with a cleaning head secured to one end thereof and the other end of said shaft provided with a handgrip;
   a squeegee having a cleaning head being removably connected to a shaft handle when in use
   a housing having a receptacle and a lid pivotally connected to said housing;
   wherein said shaft handle, in transport configuration, being removed from said cleaning head and releasably secured to said housing for transporting said device; and
   a spring loaded or spring-biased, transporting clip internally pivotally mounted inside said receptacle, wherein said transporting clip engaging said cleaning head to allow said portable device to be transported when in use and being biased by a spring to a released position that is lowered against an internal side wall of said housing to permit said cleaning head easy access to a cleaning liquid.

2. The portable device for windshield cleaning as recite in claim 1 wherein:
   said housing configured to allow for stackability of a plurality of said housings in a staggered manner.

\* \* \* \* \*